(No Model.)
W. F. BOSSERT.
ELECTRIC WALL BOX.
No. 571,297. Patented Nov. 10, 1896.
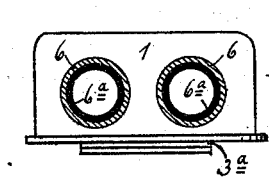
Fig. 2.
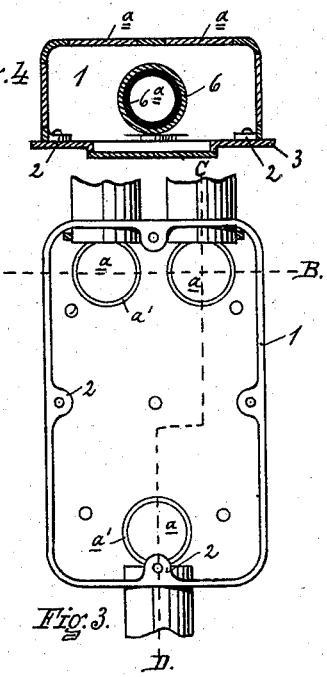
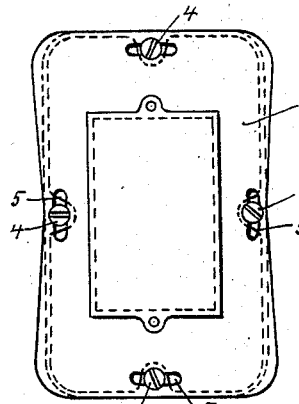
Fig. 1.
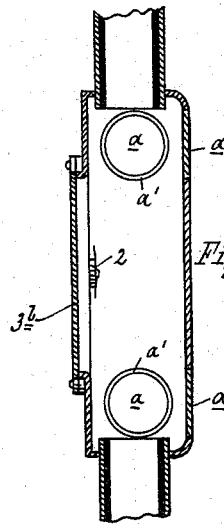
Fig. 5.
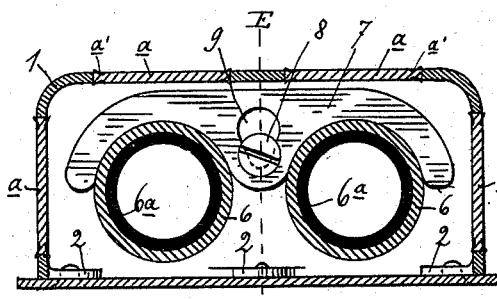
Fig. 6.
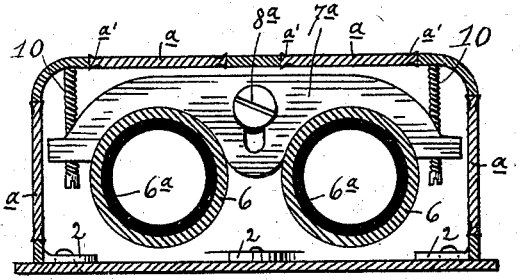
Fig. 7.
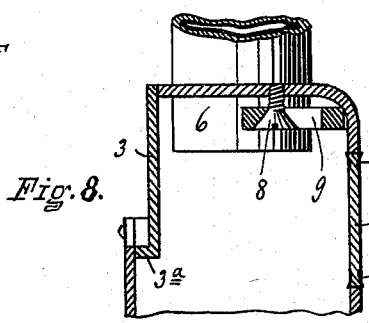
Fig. 8.
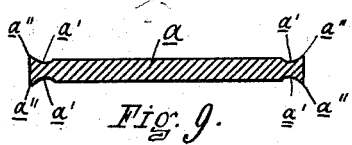
Fig. 9.
WITNESSES
Rich. A. George.
S. B. Smith
INVENTOR
WILLIAM F. BOSSERT.
By Risley, Robinson & Love
ATTORNEY's

UNITED STATES PATENT OFFICE.

WILLIAM F. BOSSERT, OF UTICA, NEW YORK, ASSIGNOR TO THE BOSSERT ELECTRIC CONSTRUCTION COMPANY.

ELECTRIC WALL-BOX.

SPECIFICATION forming part of Letters Patent No. 571,297, dated November 10, 1896.

Application filed August 3, 1896. Serial No. 601,554. (No model.)

*To all whom it may concern:*

Be it known that I, WILLIAM F. BOSSERT, of Utica, in the county of Oneida and State of New York, have invented certain new and useful Improvements in Electric Wall-Boxes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to wall-boxes employed with electric conduits in building constructions.

In the drawings which accompany this specification, Figure 1 shows a face view of the box. Fig. 2 shows the upper end of the box as shown in Fig. 1. Fig. 3 shows the box with the cover removed and three electric conduits entering the same. Fig. 4 shows a section of the box with the cover applied and looking toward the lower end of the box, as shown in Figs. 1 and 3. Fig. 5 shows a section on line C D of Fig. 3. Fig. 6 shows a section on line A B of Fig. 3, on an enlarged scale. Fig. 7 shows a section taken in the same manner of the modified form of construction. Fig. 8 shows a section taken on line E F of Fig. 6. Fig. 9 shows in section a plug-plate employed in the construction.

The body 1 of the box consists of a drawn sheet-metal case of any desired form, but, as shown in the drawings, of substantially rectangular form and provided on its upper edge with inwardly-turned ears 2 2, by means of which the cover 3 is attached. The cover is of larger dimensions than the box and is secured to the lugs 2 2 by means of screws 4 4, &c., passing through slotted openings 5 5, &c., in the cover. The slots 5 are curved with a curve of a radius equal to the distance from the slot to the center of the box and permit the cover to have a partial rotary movement on the face of the box when the screws 4 are loose.

The box-cover, as shown, is provided with a projecting face extension $3^a$, which will carry a hinged door or lid $3^b$.

The walls of the box-body 1 and its bottom are provided with numerous holes or openings suitably located and stopped by the same blank or piece $a$, which is punched out to form the hole, being driven or forced back therein. The plates $a$, when forced back to plug the holes, may have a groove $a'$ adjacent to their periphery formed by a die, which in forming the groove will force the edges of the plug out toward the periphery, so as to form lips $a''$ and thereby to firmly lock the plate or plug in place. These holes are of suitable size to receive the end of the electric conduits 6, the conduits being provided with an insulating-lining $6^a$. For securing the ends of the conduits and the box securely together when the same are in place there is provided a clamp 7, which is secured and operated by a taper-head screw 8, engaging in the wall of the box and passing through an egg-shaped opening 9 in the body of the clamp. The arms of the clamp are fitted to the conduit and pass partially around the sides of the openings stopped by the pieces $a$, particularly those in the ends of the box.

In Fig. 7 is shown a modified form of construction of clamp $7^a$, which is secured to the casing by means of a headed projection $8^a$, engaging in a slotted opening in the clamp $7^a$. This modified form of clamp is also formed with curved arms to engage the side of the conduit, but it is operated and held by set-screws 10 10, passing through each end of the clamp and resting upon the bottom of the box.

As before stated, these boxes are sent out on the market with all or nearly all the holes for the conduits stopped by the plates $a$, which have been punched out of the respective holes and forced back into the holes and practically forming a box without any conduit-openings. In the use of these boxes the conduits are liable to come to the box from the top or sides or bottom, and when the box is brought to the place where it is employed the plates $a$ in the openings, which are to be used for the entrance of the end of the conduit, are removed by being forced inwardly or outwardly, as circumstances may permit, while the others remain in place to complete the sides or bottom of the box. The conduits are then entered in the box, so that the end projects a little inside of the box, as shown in the figures, and the clamps, either 7 or 7ª, as the case may be, are then brought into operation, so as to firmly secure the box and the end of the conduits together and avoid any rattling from jar or the relative displacement of the conduits and box. The electric conductors are brought through the conduits into the box, where they may be attached to a switch or other electrical appliance inclosed in the box or attached to a lamp-bracket, which may be secured on the inner face of the box and project outwardly beyond the face of the wall. It will be understood that these boxes are placed in the wall or ceiling of a building in the plastering, if desired.

When the box is employed to contain a switch, a small cover or lid 3ᵇ may be employed in connection with the box. When the box is employed to furnish a mounting for an electric-lamp bracket or other such contrivance, the lamp-bracket is secured to the inner face of the bottom of the box and projects through the opening in the cover of the box. This opening in such case may be covered by a false base of the bracket.

As before stated, these boxes may be employed in plastered walls, and it being difficult to get the box true with the conduits and electric fixtures in place I provide the cover 3, adjustable by means of the screws 4 and curved slots 5, so that in case the box is not exactly true in the wall the cover 3 can be trued, so as to present the lid or other exposed portions in correct position.

What I claim as new, and desire to secure by Letters Patent, is—

1. The combination with a wall-box having openings adapted to receive electric conduits, of plug-plates wedged in the openings and substantially coinciding with the exterior and interior surfaces of the walls of the box.

2. The combination of the box herein described, the electric conduits entering the box and the clamp, substantially as set forth.

3. The combination with the wall-box herein described of the adjustable cover, substantially as set forth.

4. The electric wall-box having conduit-openings and a plug-plate therefor having lipped edges, substantially as set forth.

5. The combination with a wall-box having openings adapted to receive electric conduits, of plug-plates wedging in the openings and adapted to be displaced or removed to clear the opening for the conduit by being forced inwardly or outwardly, substantially as set forth.

6. A wall-box drawn out of sheet metal having numerous openings formed by punching and adapted to receive electric conduits plug-plates therefor wedging in the openings and conforming to the exterior and interior surfaces of the walls in which the opening is formed and capable of being removed by forcing the plug-plates outwardly or inwardly, substantially as set forth.

In witness whereof I have affixed my signature in presence of two witnesses.

WILLIAM F. BOSSERT.

Witnesses:
  E. WILLARD JONES,
  PHEBE A. TANNER.